No. 735,796. PATENTED AUG. 11, 1903.
O. A. MYGATT.
ART OF WORKING GLASS.
APPLICATION FILED DEC. 2, 1902.
NO MODEL.

WITNESSES:
Chas. K. Davies.
M. E. Brown.

INVENTOR
O. A. Mygatt
BY W. H. Bartlett
Attorney

No. 735,796.

Patented August 11, 1903.

UNITED STATES PATENT OFFICE.

OTIS A. MYGATT, OF NEW YORK, N. Y.

ART OF WORKING GLASS.

SPECIFICATION forming part of Letters Patent No. 735,796, dated August 11, 1903.

Application filed December 2, 1902. Serial No. 133,553. (No specimens.)

*To all whom it may concern:*

Be it known that I, OTIS A. MYGATT, a citizen of the United States, residing at New York, in the county of New York and State of New York, have invented certain new and useful Improvements in the Art of Working Glass, of which the following is a specification.

This invention relates to an improvement in the art of working glass, and is especially adapted to the production of prism glass globes and other hollow ware with surface projections or depressions.

The object of the present invention is to so manipulate hot glass that a much thinner ribbed or prism globe or hollow article can be made than has heretofore been the practice and the glass of which such an article is made may be of more uniform consistency than has been common heretofore.

In order to make my invention clear, it is necessary to refer to the state of the art as heretofore known to me in my practice as a manufacturer.

Figure 5:
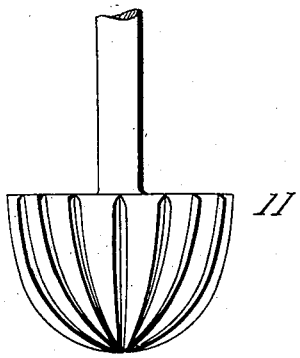

Prism glass globes have been made in molds heretofore of the general character illustrated in Figure 5, in which there is a mold or female die corresponding with the outer surface of the completed article and a plunger corresponding with the inside of such article. A quantity of so-called "molten" glass is placed in the die and the plunger forced down thereon. Now molten glass at any temperature at which it can be molded is not a liquid, but is a more or less plastic or waxy composition. A quantity of such glass placed in the bottom of a mold is by pressure of the plunger forced upward around the plunger and between said plunger and the sides of the mold. As the pressure drives the glass upward in the mold the resistance of the tenacious glass is considerable. The glass does not often flow evenly. It loses its plasticity as it rises in the mold. It radiates heat unevenly, and when it sets the texture of different parts of the same article is uneven. Articles pressed in this way must be annealed for a long time, and there is much loss by defective construction. Where the glass has to be driven into grooves in the mold to form prisms intended to be of precise construction, the difficulty of securing good results is greatly increased. Glass will not flow to form very fine and sharp angles, and all prism glass heretofore made in molds departs more or less from theoretical accuracy.

I overcome the difficulties heretofore existing in the following manner:

To carry out my invention, I make use of certain mechanism which I will describe; but I do not herein claim any specific mechanism, nor do I limit myself to mechanism.

Figure 1:
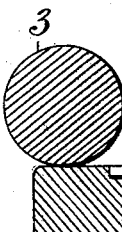
Figure 1:
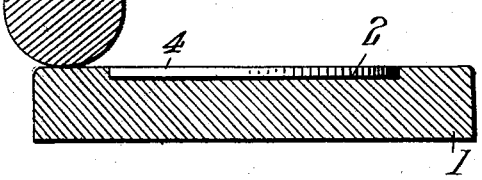
Figure 4:
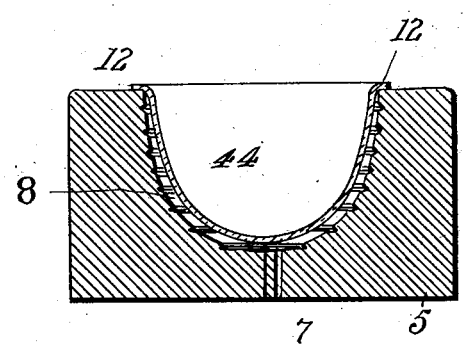
Figure 2:
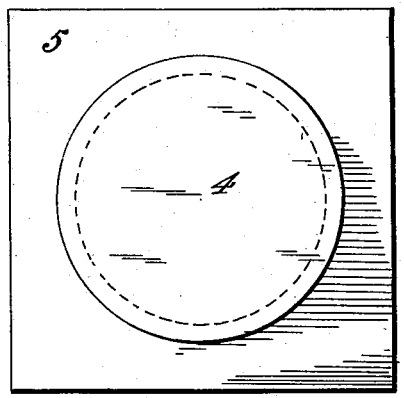
Figure 3:
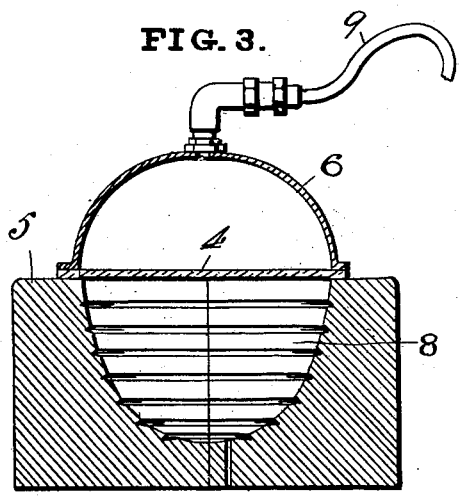
Figure 3:
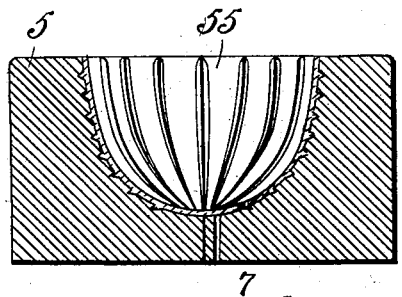

Fig. 1 is a sectional view of a rolling-bed and roller. Fig. 2 is a plan of the rolling-bed. Fig. 3 is a section of a mold for molding ribbed or prism glass, showing a sheet of glass in position over the mold and a dome surmounting the same, said dome provided with means for applying air or steam pressure to the sheet of glass. Fig. 4 is a section of a mold with the plate blown down to approximately to general form of the mold. Fig. 5 is a section of a mold, showing a pressed semispherical globe therein and showing a plunger as just withdrawn from the molded article.

Let 1 designate a rolling-bed with a recess 2 in its face. For a semispherical globe and many other forms of molded articles the recess 2 will be circular and of such depth that a sheet of glass which just fills the recess furnishes just enough glass to make a semispherical globe. A quantity of molten or plastic glass, determined by weight or otherwise to be sufficient to make the desired article, is placed in the recess 2 and rolled down by roller 3 to the size and thickness desired. This produces a round plate 4. The plate of hot glass 4 is removed from the recess 2 and instantly placed over the mouth of mold 5. By its own weight the plastic sheet will sag more or less into the mold and assume the form of a semisphere or bowl in the mold. To insure even action, however, I prefer to place a dome or cover 6 over the plate. The outer rim of this dome rests on and clamps the edge of plate 4 around the margin of bowl 8 in the mold. Air, steam, or gas pressure is applied to the plate 4, such being forced into the dome through tube 9 in any suitable way. This has the effect to force the plate 4 into the form of a bowl 44, approximately fitting the inside of the mold. Air-ducts may be provided in the body of the mold (see 7) to permit the escape of air from around the article blown into the mold. The dome 6 is quickly withdrawn, and the plunger 11 is forced down upon the partly-formed article. The pressure of the plunger forces the glass into the mold, and as no part of the plastic glass has far to flow to reach the grooves or depressions in the mold and plunger a sharper definition can be had than has been common in molded articles heretofore. Much less material is required to insure a complete and well-defined article than where the formation depended on the plunger alone. A glass article produced by this method is likely to be much more uniform in texture and homogeneous in structure than where the plunger has had to force the material a greater distance. As soon as the article has sufficiently cooled the plunger is withdrawn and the mold opened to release the article, after which other articles may be molded in like manner.

The rim 12, Fig. 4, should be as narrow as circumstances will warrant. The action of the plunger will draw this more or less into the mold. Any residue may form a rim about the completed article 55 or may be cut away by the action of the plunger or subsequently removed by suitable means.

As the successive steps of my method are generally pursued while the glass is hot and before it cools sufficiently to lose its plasticity, it is desirable that the rolling-table and the mold be near each other and that the rolled plate be quickly transferred to the mold and there blown and pressed. The rolled plate is not necessarily of uniform thickness. The rolling-table may be so formed as to aggregate a quantity of glass at any point where it will be most needed in the further prosecution of the work.

Prismatic glass to be of much use requires to have its surfaces formed with the greatest accuracy. For the transmission of light it is desirable that the body of the article, such as a lamp globe or shade, be as thin as possible between the prisms, which may be formed on its inner and outer surfaces. By my method I am able to reduce the quantity of material necessary to construct satisfactory shades more perfect in form and much thinner and lighter than such articles have heretofore been made. The illustrations are not intended to show the form of the prisms on the glass, as such vary to an almost unlimited extent.

Glass articles have been heretofore made which were pressed to approximate form and there blown out into the mold. As the final pressure is a mere air-pressure, no well-defined designs, such as prisms, can be produced by such means. Prism glass has been produced by rolling to approximate form and then impressing prisms on the surface by rolling or by the action of a plunger. Such means fail to produce as transparent a glass as is desirable.

My method in its entirety contemplates the rolling, then the blowing, then the pressing; but as I believe there is novelty and utility in some of the various steps I desire to claim the method as a whole and also the separate novel steps.

What I claim is—

1. The method of forming hollow articles of glass, which consists in rolling out a sheet of plastic glass, blowing this into a mold to approximately fit the mold, and immediately compressing in the mold by mechanical action other than blowing.

2. The method of forming articles of glass, which consists in providing a quantity of hot plastic glass closely calculated to form the article, rolling the same to a plate of the approximate diameter of the completed article, placing this plate over the mold and confining the edge, blowing the plate into the mold to approximately follow the outline thereof, then pressing the material into the mold by mechanical action other than blowing.

3. The method of forming a glass article, which consists in securing the edge of a sheet of hot plastic glass about the edge of a mold, blowing the sheet to the approximate form of the mold by means of air or steam applied to the surface opposite the mold, and completing the formation by the action of a plunger compressing the material into the mold.

4. The method of forming a globe or shade of prismatic glass, which consists in rolling a quantity of hot plastic glass to the general diameter of the globe, forcing it to concavo-convex form in a mold by a blowing pressure applied to one side of the rolled material, then quickly pressing to accurate form by the action of a plunger in the mold.

5. The method of making hollow articles of glass, which consists in heating glass to a plastic condition, forming a sheet therefrom, blowing in a mold to the approximate shape of the desired article, then compressing rigidly in the mold by mechanical action.

6. The method of making hollow articles of glass, which consists in heating glass to a plastic condition, forming a sheet therefrom, applying the sheet to a mold and partially shaping the sheet to the mold by yielding pressure, then pressing the article by rigid mechanical means.

In testimony whereof I affix my signature in presence of two witnesses.

OTIS A. MYGATT.

Witnesses:
IRA FERGUSON,
H. E. NASON.